Nov. 2, 1965   E. SCHMOOK, JR., ETAL   3,215,535
PROCESS OF CONTINUOUSLY COMMINUTING MEAT
Original Filed May 27, 1959   3 Sheets-Sheet 1

INVENTORS.
Edward Schmook, Jr.,
Andrew H. Vedvik,
BY
Trist, Lockwood
Dunnawalt & Dewey
Attys Nov. 2, 1965   E. SCHMOOK, JR., ETAL   3,215,535
PROCESS OF CONTINUOUSLY COMMINUTING MEAT
Original Filed May 27, 1959   3 Sheets-Sheet 2

INVENTORS.
Edward Schmook, Jr.,
BY Andrew H. Vedvik,
Greist, Lockwood,
Greenawalt & Dewey
Attys INVENTORS
Edward Schmook, Jr.,
BY Andrew H. Vedvik,

United States Patent Office 3,215,535
Patented Nov. 2, 1965

3,215,535
PROCESS OF CONTINUOUSLY COMMINUTING MEAT
Edward Schmook, Jr., and Andrew H. Vedvik, Madison, Wis., assignors to Oscar Mayer & Company, Inc., Chicago, Ill.
Original application May 27, 1959, Ser. No. 816,127, now Patent No. 3,108,626, dated Oct. 29, 1963. Divided and this application Jan. 23, 1963, Ser. No. 260,091
3 Claims. (Cl. 99—109)

This application is a division of copending application Serial No. 816,127 filed May 27, 1959, now Patent No. 3,108,626 issued Ocober 29, 1963.

The present invention is directed to a new and improved material handling and comminuting device which is particularly adapted for use in sausage making wherein batter preparation includes the fine chopping or comminution of the meat ingredient thereof. More specifically, the present invention is directed to a continuous chopper assembly capable of uninterrupted operation during which meat particles are comminuted and otherwise automatically and continuously processed without batchwise handling, the assembly being particularly adapted for inclusion in a continuous sausage maaking opertion wherein the raw materials are introduced into continuously operating equipment and the finished sausage product is obtained therefrom.

It is an object of the present invention to provide a new and improved continuous chopper assembly which provides for improved material handling during comminution thereof, the assembly being capable of continuously comminuting, collecting and delivering material without the necessity of batchwise operation.

Another object is to provide a new and improved material comminution and delivery arrangement wherein comminuted meat is continuously delivered from a chopper or the like into an accumulation and discharge means, the latter means being subject to direct and mechanically coupled operation by the chopper.

Still another object is to provide a completely enclosed comminution and material delivery assembly particularly adapted for use in the particle size reduction of oxidizable material such as meat, the comminution, accumulation and discharge operations of the assembly being mechanically, structurally and continuously tied in with one another to permit efficient sub-atmospheric or super-atmospheric (including inert gas injection) operation of the entire system as well as economical single drive mechanical operation thereof.

Other objects not specifically set forth will become apparent from the following detailed description made in conjunction with the drawings wherein.

While the chopper assembly of the present invention will be described particularly in connection with its use in making comminuted meat products such as sausage, it will be understood that the assembly is well adapted for use in comminuting, accumulating and discharging in a continuous and automatic manner any material which can be subjected to the sequence of operations to be described.

Figure 1:
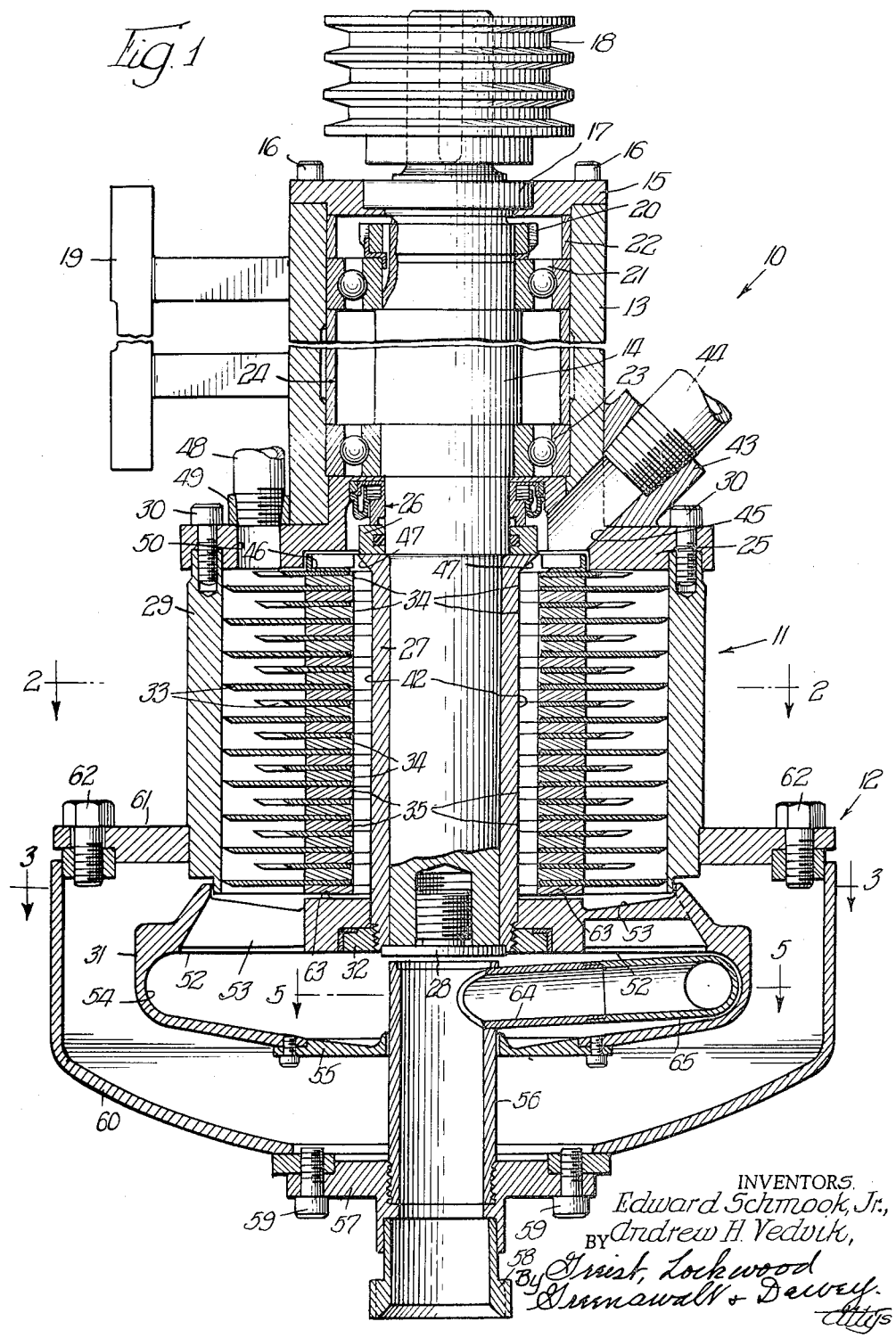
FIG. 1 is a fragmentary vertical section of the continuous chopper assembly of the present invention.

Referring particularly to FIG. 1, the continuous chopper assembly 10 generally includes a material particle size reduction zone 11 constituting the chopper portion of the assembly and a material collection and discharge zone generally designated by the numeral 12. Specifically, the assembly 10 includes a sleeve-like upper shaft housing 13 receiving therein a shaft 14 the uppermost end of which projects outwardly of the assembly through an end cap 15 suitably connected to the top end of the housing 13 by a plurality of cap screws 16. The end cap 15 seats a suitable shaft sealing member 17 which is in engagement with the shaft 14. The upper projecting end of the shaft 14 is drive connected to a sheave 18 which is provided with a plurality of grooves in which drive belts (not shown) are received, the drive belts being suitably driven by a power source resulting in rotation of the shaft 14. As illustrated, the assembly 10 is arranged for vertical operation and for the purpose of mounting the assembly a suitable mounting bracket 19 is fixedly connected to the housing 13.

Within the housing 13, the shaft 14 has received thereabout a combined locknut and washer 20 engaging the inner race of a bearing 21 fixed on the shaft and with the outer race held at one end by a bearing clamp ring 22. A spaced bearing 23 is received in the housing 13 about the shaft 14 and the bearings 21 and 23 being maintained in operative positions by a spacer sleeve 24. The lower bearing 23 is received on an upwardly projecting sleeve-like portion of a chopper housing cover plate 25, the housing 13 being mounted about the upwardly projecting portion of the cover plate 25 in fixed engagement with the surrounding top surface of the cover plate. A suitable expandable type shaft seal 26 extends between the lower bearing 23 and a sleeve 27 which is received about the bottom portion of the shaft 14. The sleeve 27 is held against axial movement relative to the shaft 14 by a lock stud 28 threadedly received in the bottom of the shaft. The cover plate 25 encloses the top of a cylindrical chopper housing 29 by means of cap screws 30.

The sleeve 27 is suitably spline connected to the shaft 14 (FIG. 2) for rotation therewith and at the bottom thereof has spline connected thereto a cup-shaped material collection means in the form of a rotor 31. The rotor rotates with the sleeve 27 and shaft 14 and is held against axial displacement therefrom by a locknut 32.

Within the chopper housing 29, a plurality of chopper blade members 33 are mounted by a series of alternately positioned blade mounting rings 34 and ring spacers 35. As particularly shown in FIG. 2, each blade member 33 is of generally triangular outline being provided with a convex cutting edge 36 which includes a bevel 37 on the underside thereof. Each blade mounting ring 34 carries thereon four (more or less as desired) circumferentially spaced blade members 33 each of which is attached by a pair of dowel-like pins 38. For mounting on the ring 34, each blade member 33 is provided with an outwardly opening slot 39 receiving one of the pins 38 therein and a drilled opening 40 in which the remaining pin 38 is received. Actually, each blade mounting ring 34 carries a complement of four blade members 33 on opposite sides thereof as illustrated in FIG. 1 with alternate series of blade members being circumferentially staggered as particularly shown in FIG. 2. The spacers 35 are suitably designed to provide for adequate spacing between blade mounting rings 34 and the blade members carried thereby with pin receiving apertures therein (not shown) to interlock the assembly and prevent relative movement therebetween.

Figure 2:
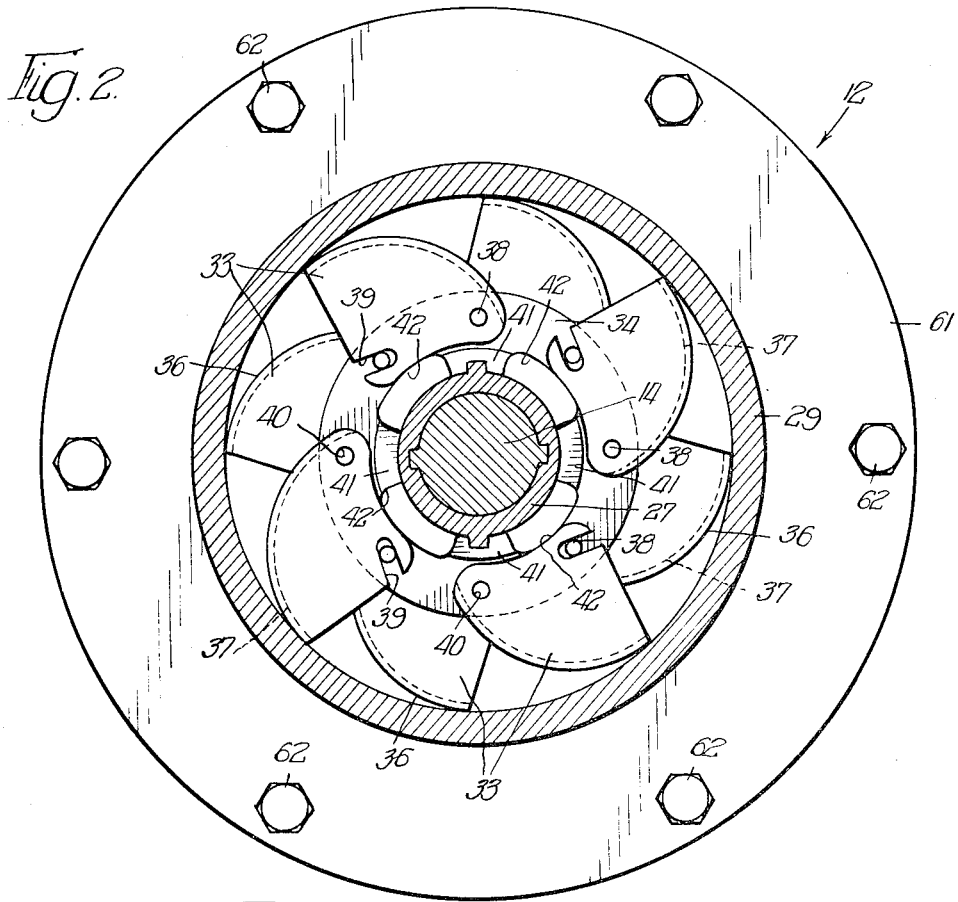
FIG. 2 is a sectional plan view of the chopper portion of the assembly taken generally along line 2—2 in FIG. 1.

Still referring particularly to FIG. 2, each blade mounting ring 34 and spacer 35 is centrally webbed as defined by inwardly projecting flange-like portions 41 which hug the sleeve 27 and are circumferentially spaced thereabout to establish intermediate the same a plurality of axially directed air evacuation or gas input passages or ports 42 extending the full axial length of the sleeve 27. The passages 42 serve for air evacuation purposes as will be described although it should be understood that inert gas such as nitrogen may be injected into the assemlby utilizing the ports 42 for delivery purposes.

The cover plate 25 as shown in FIG. 1 carries an outlet fitting 43 having the end of an air suction tube or pipe 44 suitably threaded therein. The fitting 43 is in line with an angled port 45 which extends through the cover plate 25 into communication with the top portion of the sleeve 27. The top of the sleeve 27 is provided with an integrally formed, radially outwardly extending cup-shaped portion 46 which includes a plurality of angled openings 47 therein which are in communication with the axially extending passages 42. Air evacuation occurs through the port 45 with air being delivered thereto through the passages 42, air being drawn from between the blade members 33 in the outer peripheral comminution zone due to the circumferential spacing of the blade members on each mounting ring 34 (see FIG. 2).

The operation of the chopper portion 11 of the assembly 10 is the same as disclosed in the co-pending application Serial No. 701,815, filed December 10, 1957, now Patent No. 2,974,701, issued March 14, 1961. Material, such as relatively small chunks of meat which may be mixed with sausage batter ingredients, is delivered into the housing 29 through an inlet tube 48 having a nozzle portion threadedly received in an inlet fitting 49 suitably secured to the cover plate 25 of the housing 29, the plate 25 being provided with an inlet opening 50 which is located in close association with the outer periphery of the housing 29 directly over the uppermost series of blade members 33. The particles of meat are continuously pumped into the chopper portion 11 and into contact with the blade members 33 which are rotated at relatively high speeds as, for example, within the range of 3,000 to 4,500 r.p.m., operation at these speeds providing adequate centrifugal force to provide for an accumulation of meat along the inner surface of the housing 29 to define a continuously moving meat sleeve. The meat is thus placed in contact with the cutting edges 36 of the blade members 33, these cutting edges being closely spaced to the inner surface of the housing 29. The thickness of the sleeve-like accumulation of meat may vary from approximately 1/8 to 5/8 of an inch with the cutting edge of each blade member 33 continuously moving through the accumulation for relatively fine comminution thereof. The substantial centrifugal force developed by the high speed rotation of the blade members 33 will maintain the meat particles against the inner surface of the housing 29 and the bevels 37 formed on the bottom edges of the blade members 33 will provide for continuous movement of the accumulated meat particles downwardly along the inner surface of the housing 29 toward the lower discharge end of the chopper portion 11.

During comminution of the meat, continuous air evacuation occurs through the tube 44 as previously described, the air released from the meat particles as a result of comminution being drawn inwardly between the blade members 33 into the passages 42 and upwardly through the ports 47 into the tube 44. A vacuum may be drawn on the system to any extent desired.

Figure 3:
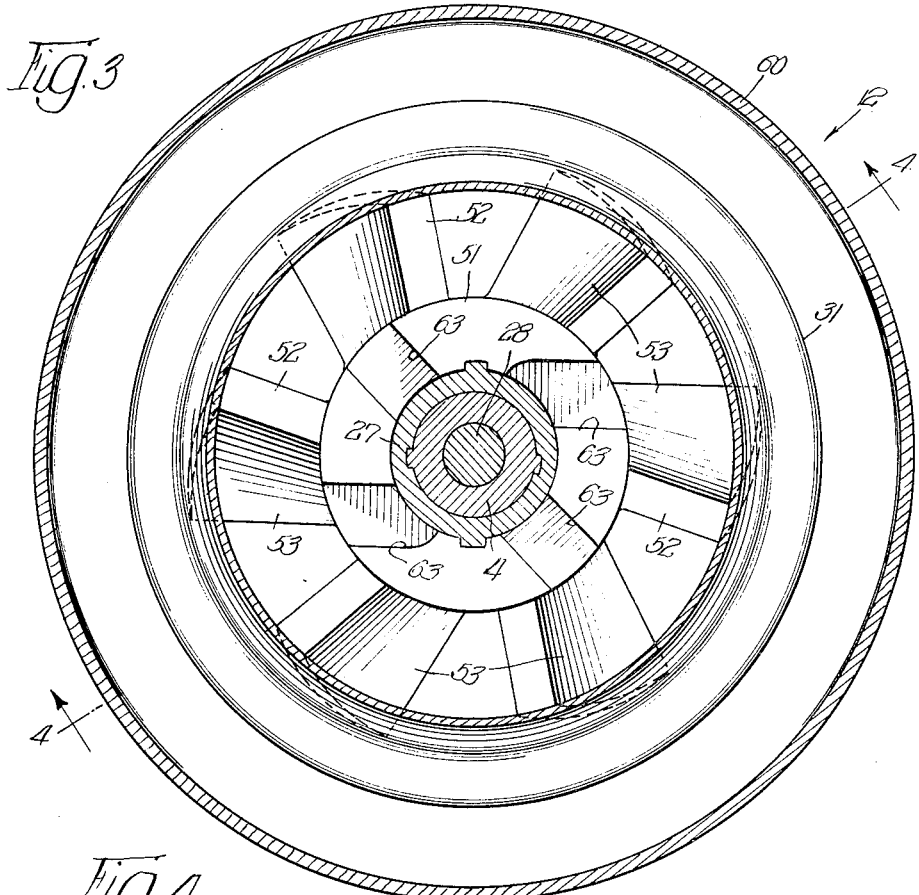
FIG. 3 is a sectional plan view of the material collection and discharge portion of the assembly taken generally along line 3—3 in FIG. 1.

The comminuted meat or other material is delivered from the chopper portion 11 of the assembly 10 into the discharge rotor 31 for peripheral accumulation therein in response to centrifugal force accompanied material discharge therefrom in a manner to be described. The rotor 31 is in the form of a rotating bowl provided with an upstanding rim which is closely received about the lower end of the chopper housing 29 to prevent material loss therebetween. The rotor includes a central hub portion 51 as particularly shown in FIGS. 1, 3 and 4. The hub 51 is suitably spline connected to the sleeve 27 and shaft 14 in the manner previously described for rotation of the rotor 31 therewith. The outer bowl portion of the rotor 31 is supported by the hub 51 through a plurality of web-like vanes 52 which are beveled along the top surfaces thereof to provide angled material guiding surfaces 53. As particularly shown in FIG. 3, the top edges of the surfaces 53 are somewhat divergent from the bottom edges thereof in an outwardly direction to provide a slope or pitch thereto which is inclined both downwardly and outwardly to deliver material toward and into the outer peripheral portion of the bowl of the rotor.

The bowl portion of the rotor 31 is provided with a peripheral material collecting zone 54 and includes a bottom central opening which is partially covered by a shield ring 55 suitably bolted in place. The shield ring 55 is centrally apertured and receives therethrough a stationary discharge pipe 56, adequate clearance being provided between the adjacent surfaces of the pipe 56 and shield plate 55 to permit high speed rotation of the rotor 31 relative to the pipe 56. The pipe 56 is threadedly mounted in a bottom cover plate 57 which carries on the outer side thereof a sleeve 58 for suitable connection with a comminuted material delivery tube or pipe (not shown), the sleeve 58 being axially aligned through the plate 57 with the pipe 56.

The plate 57 is attached by cap screws 59 in covering relation with a central bottom opening in a housing 60 which is received about the rotor 31 in enclosing relation thereto. The housing 60 circumferentially overextends the bottom end of the chopper portion 11 and has received thereon a flange-like cover member 61 which is suitably connected thereto by removable fasteners 62. The cover plate 61 is fixedly attached to the outer surface of the chopper housing 29 to complete the external housing portion of the assembly. With this preferred arrangement, the entire assembly in operation with product being withdrawn from the rotor 31 is sealed and efficient air evacuation through the port 45 can be accomplished.

In connection with this air evacuation, vacuum operation of the entire assembly is possible as the passages 42 extend downwardly throughout the entire chopper assembly portion and are not only in communication with the comminution zone through the spaces between the blade members 33 as previously described but also are placed in communication with the interior of the rotor 31 through a plurality of radially directed grooves 63 (FIG. 3) formed in the top surface of the hub 51 of the rotor 31. Air is continuously and immediately removed from the assembly 10 upon its release from the material during mechanical comminution and continuous working thereof by the operative elements of the assembly.

Figure 5:
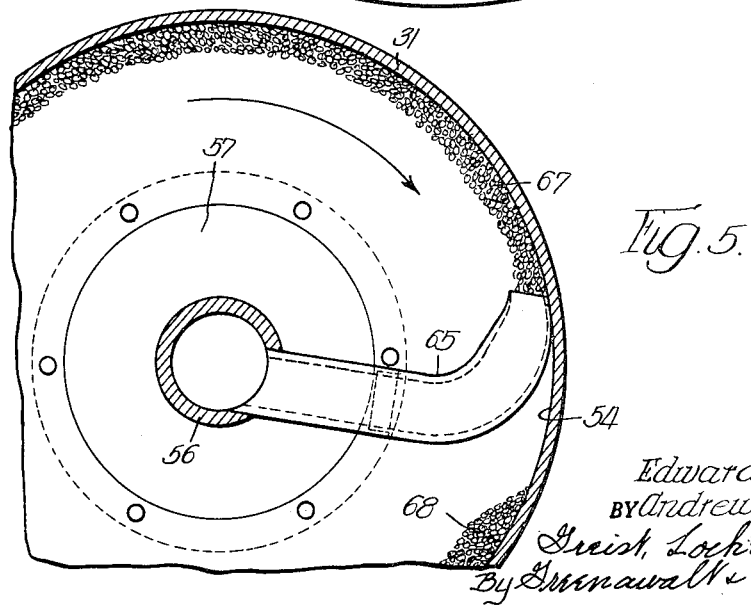
FIG. 5 is a partial plan section of a part of the material collection and discharge portion of the assembly taken generally along line 5—5 in FIG. 1.

As particularly illustrated in FIGS. 1 and 5, the fixed pipe 56 at the top portion thereof which is received within the rotor 31 has suitably secured therein a radially outwardly directed tube sleeve 64 which has fixedly received on the outer end thereof a material pick-up nozzle 65 which curves into close association with the surface of the rotor 31 in the material collection zone 54. The outermost end of the nozzle 65 is open to receive material therein in scoop-like manner during rotation of the rotor 31. The high speed at which the product is rotated by the rotor 31 provides adequate discharge force to move the material through the nozzle 65 and tubes 64 and 56 to the point of discharge at the bottom of the assembly. Actually, the force under which the material is adequate to continuously move the material through a tube or pipe connected to the discharge sleeve 58 into other material processing equipment, such as a mixer or sausage stuffer as the case may be. Preferably, the nozzle is spaced from the outer periphery of the rotor 31 approximately 0.015 to 0.030 inch.

Figure 4:
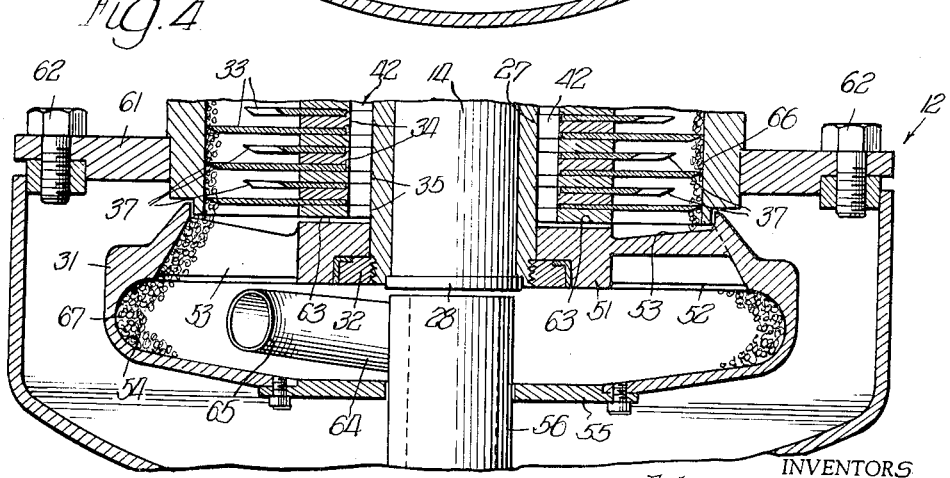
FIG. 4 is a fragmentary transverse section of the material collection and discharge portion of the assembly taken generally along line 4—4 in FIG. 3.

In connection with the important aspects of continuous operation of the assembly accompanied by the maintenance of de-aeration conditions where desired, FIG. 4 illustrates the sleeve-like accumulation 66 of comminuted material established and maintained in the chopper portion 11 of the assembly. The accumulation 66 is continuously moved downwardly along the inner surface of the chopper housing 29 and is guided by and across the inclined surfaces 53 of the vanes 52 toward the outer periphery of the interior of the rotor 31. Centrifugal force resulting from the high speed rotation of the rotor 31 provides for the continuous maintenance of an accumulation 67 of comminuted material in the material collection zone 54 thereof and into which the nozzle opening of the fixed discharge elements projects. As particularly illustrated in FIG. 5, discharge of the accumulation 67 of material from the rotor 31 occurs as a result of virtual sweeping of the material collection zone 54 and as the rotor moves past the nozzle 65, a new accumulation 68 of material commences. During the entire operation, vacuum conditions are maintained with oxygen-bearing air being removed from the material for preservation thereof as well as color maintenance in connection with meat.

While a preferred form of chopper portion 11 has been described, it will be understood that other suitable comminution equipment may be used in combination with the material collection and discharge portion 12 of the assembly. The preferred chopper portion particularly lends itself to use in the assembly in view of the cooperating single drive feature, material accumulation aspects and air evacuation provisions.

Obviously certain modifications and variations of the invention as hereinbefore set forth may be made without departing from the spirit and scope thereof, and therefore only such limitations should be imposed as are indicated in the appended claims.

We claim:
1. The process of continuously comminuting meat in the preparation of a sausage batter, said process comprising continuously delivering meat particles into a comminution equipment may be used in combination with the subjecting said meat particles to centrifugal force in said comminution zone to accumulate said particles into a peripheral sleeve, continuously moving said sleeve of meat particles through said comminution zone while said particles are undergoing size reduction, continuously discharging said sleeve of meat particles from said comminution zone into an accumulation zone while continuously subjecting said sleeve to centrifugal force during and subsequent to said discharge into said accumulation zone which is rotating at high speed to provide for outer peripheral accumulation of the meat particles in said accumulation zone under the influence of said centrifugal force, and continuously withdrawing the accumulated meat particles from said accumulation zone under the influence of said centrifugal force.

2. The process of claim 1 wherein said zones are maintained under vacuum conditions.

3. The process of claim 1 wherein said zones are maintained under inert gas injected conditions.

References Cited by the Examiner
UNITED STATES PATENTS

| | | | |
|---|---|---|---|
| 2,681,279 | 6/54 | Sloan et al. | 99—109 |
| 2,836,825 | 5/58 | Schnell | 99—109 X |
| 2,974,701 | 3/61 | Eberman | 146—192 |

A. LOUIS MONACELL, *Primary Examiner.*

HYMAN LORD, *Examiner.*

UNITED STATES PATENT OFFICE
CERTIFICATE OF CORRECTION

Patent No. 3,215,535                 November 2, 1965

Edward Schmook, Jr., et al.

It is hereby certified that error appears in the above numbered patent requiring correction and that the said Letters Patent should read as corrected below.

Column 1, line 25, for "maaking" read -- making --; line 26, for "opertion" read -- operation --; column 3, line 11, for "assemlby" read -- assembly --; line 74, after "accompanied" insert -- by continuous --; column 6, line 8, strike out "equipment may be used in combination with the" and insert instead -- zone wherein particle size reduction is obtained, --.

Signed and sealed this 9th day of August 1966.

(SEAL)
Attest:

ERNEST W. SWIDER
Attesting Officer

EDWARD J. BRENNER
Commissioner of Patents